US011312397B2

(12) United States Patent
Kim et al.

(10) Patent No.: US 11,312,397 B2
(45) Date of Patent: Apr. 26, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Donghyuk Kim, Hwaseong-si (KR); Seunghyun Kim, Seoul (KR); Ilhwan Kim, Hwaseong-si (KR); Hong Gi Park, Seoul (KR); Kyung-joo Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 188 days.

(21) Appl. No.: 16/745,063

(22) Filed: Jan. 16, 2020

(65) Prior Publication Data
US 2021/0053591 A1    Feb. 25, 2021

(30) Foreign Application Priority Data

Aug. 20, 2019    (KR) .......................... 10-2019-0101635

(51) Int. Cl.
*B60W 60/00*    (2020.01)
*G05D 1/02*    (2020.01)
*G05D 1/00*    (2006.01)

(52) U.S. Cl.
CPC .... *B60W 60/0059* (2020.02); *B60W 60/0053* (2020.02); *B60W 60/0057* (2020.02); *B60W 60/0061* (2020.02); *B60W 60/00133* (2020.02); *G05D 1/0061* (2013.01); *G05D 1/0214* (2013.01); *G05D 1/0293* (2013.01); *B60W 2540/00* (2013.01); *B60W 2540/223* (2020.02); *B60W 2540/225* (2020.02); *B60W 2540/227* (2020.02); *G05D 1/0027* (2013.01)

(58) Field of Classification Search
CPC ......... B60W 60/0057; B60W 60/0059; B60W 60/0061; B60W 60/0053; B60W 2540/00; B60W 2540/223; B60W 2540/227; B60W 2540/225; B60W 2540/229; G05D 1/0061
USPC .......................................................... 701/23
See application file for complete search history.

(56) References Cited

U.S. PATENT DOCUMENTS

| 2016/0378114 | A1* | 12/2016 | Laur | ..................... | B60W 50/14 |
| | | | | | 701/23 |
| 2017/0015331 | A1* | 1/2017 | Laur | ..................... | B60W 50/14 |
| 2018/0088574 | A1* | 3/2018 | Latotzki | .............. | G05D 1/0251 |
| 2018/0329414 | A1* | 11/2018 | Igarashi | ............... | B60W 40/08 |

(Continued)

FOREIGN PATENT DOCUMENTS

KR    10-1972550 B1    4/2019

*Primary Examiner* — Nadeem Odeh
(74) *Attorney, Agent, or Firm* — Lempia Summerfield Katz LLC

(57) ABSTRACT

A vehicle includes: a capturer to capture a driver of the vehicle driving in an autonomous driving mode to obtain driver position information; a driver state detector to detect a state of the driver; and a controller to determine a time required to change from the autonomous driving mode to a manual operation mode based on the obtained driver position information and the detected driver state. In particular, the controller controls the change to driving mode of the vehicle based on the determined time to change from the autonomous driving mode to the manual operation mode.

20 Claims, 8 Drawing Sheets

(56) References Cited

U.S. PATENT DOCUMENTS

| | | | |
|---|---|---|---|
| 2019/0011914 A1* | 1/2019 | Park | B60W 40/09 |
| 2019/0056732 A1* | 2/2019 | Aoi | B60W 50/14 |
| 2020/0283028 A1* | 9/2020 | Oba | B60W 60/0057 |
| 2020/0307644 A1* | 10/2020 | Hattori | B60W 50/16 |
| 2021/0016805 A1* | 1/2021 | Oba | B60W 60/0057 |

* cited by examiner

FIG. 7

| | 501 | 502 | 503 | 700 |
|---|---|---|---|---|
| POSITION | SEAT POSITION | SEAT BELT | DRIVER STATE | TIME |
| DRIVER'S SEAT | - | - | - | - |
| DRIVER'S SEAT | SEAT ROTATION | - | - | +3.5 SECOND |
| ASSISTANT SEAT | - | FASTEN | - | +4 SECOND |
| ASSISTANT SEAT | - | NO FASTEN | - | +3 SECOND |
| - | - | - | NOT KEEPING EYES FORWARD | +0.5 SECOND |
| - | - | - | DROWSINESS | +1 SECOND |
| PASSAGE | - | - | - | +1 SECOND |
| SITTING ON BED | - | - | KEEP EYES FORWARD | +2 SECOND |
| SITTING ON BED | - | - | NOT KEEPING EYES FORWARD | +3 SECOND |
| LYING ON BED | - | - | AWAKE | +4 SECOND |
| LYING ON BED | - | - | SLEEP | +5 SECOND |

601: DRIVER'S SEAT rows
602: ASSISTANT SEAT rows
603: PASSAGE row
604: SITTING ON BED rows
605: LYING ON BED rows

VEHICLE AND METHOD OF CONTROLLING THE SAME

CROSS-REFERENCE TO RELATED APPLICATION

This application claims priority to and the benefit of Korean Patent Application No. 10-2019-0101635, filed on Aug. 20, 2019, the entire contents of which are incorporated herein by reference.

FIELD

The present disclosure relates to a vehicle and a method of controlling the vehicle, and more particularly, to a technology for controlling a vehicle in consideration of a driver's position and a driving mode when switching from autonomous driving to a manual operation of a driver.

BACKGROUND

The statements in this section merely provide background information related to the present disclosure and may not constitute prior art.

Generally, vehicles are driven on roads or tracks to transport people or goods to destinations. Vehicles are able to move to various locations on one or more wheels mounted onto the frame of the vehicle. Such vehicles may be classified into three- or four-wheel vehicles, a two-wheel vehicle such as a motorcycle, construction machinery, bicycles, trains traveling along rails on tracks, and the like.

In modern society, vehicles are the most common transportation means, and people using the vehicles are ever increasing. With the development of automotive technology, there are advantages of traveling long distances, but problems also often arise in traffic conditions worsen and traffic jams increase where population densities are high.

To relieve burdens and improve convenience of a driver, recent studies regarding vehicles equipped with an Advanced Driver Assist System (ADAS) that actively provides information regarding a state of the vehicle, a state of the driver, and surrounding conditions are actively ongoing.

In addition, autonomous driving is becoming common in the control of vehicles, and platooning in which multiple vehicles collectively drive while maintaining a constant distance is frequently performed. The platooning is a collective term for a method of driving the multiple vehicles on the road in dense groups with a minimal or reduced spacing between the vehicles to reduce fuel consumption and increase the transport capacity of highway systems.

In the platooning, it is important to secure safety when controlling an inter-vehicle distance and a driving mode between the multiple vehicles. On the other hand, when the platooning is performed by the autonomous driving, the autonomous driving may be released in specific situations and the driver may switch to a manual operation mode. We have discovered that it is desired to develop a technology to safely switch a vehicle control mode in consideration of a driver's position and the driving mode.

SUMMARY

The present disclosure provides a vehicle with a safe control based on a driver's position and a driving mode when switching from autonomous driving to a driver's manual operation, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes: a capturer configured to capture a driver of the vehicle driving in an autonomous driving mode and obtain position information of the driver; a driver state detector configured to detect a state of the driver; and a controller configured to: determine a first time period to change from the autonomous driving mode to a manual operation mode of the vehicle based on the position information and the state of the driver, and control a driving state of the vehicle to be changed based on the first time period to change from the autonomous driving mode to the manual operation mode.

In one form, the controller may determine whether the driver is located in one of a driver seat, an assistant seat, a rear seat, a passage of the vehicle, or a bed provided in the vehicle, based on the position information of the driver, and determine differently a second time period to change to the manual operation mode based on the determined location of the driver in the vehicle.

The driver state detector is configured to detect a direction of eye gaze of the driver and obtain gaze information of the driver from the detected eye gaze direction. The controller may determine a degree of risk of driving the vehicle based on the obtained gaze information of the driver, and further determine differently a third time period to change to the manual operation mode based on the determined degree of risk.

In another form, the vehicle may further include a seat belt fastening detector configured to detect whether a seat belt of the vehicle is fastened. The controller may determine differently a fourth time period to change to the manual operation mode based on whether the seat belt is fastened.

In other form, the controller may sum up each time period (e.g., the first, second, third and fourth time periods) for the change to the manual operation mode determined based on each of the obtained driver's position information, the detected driver state, and whether the detected seat belt is fastened, and then may determine a total time based on the calculated sum for the driver to sit in the driver seat and to start the manual operation mode of the vehicle.

The controller may maintain the autonomous driving mode when the total time is less than or equal to a first reference time.

When the total time is greater than a first reference time and is less than or equal to a second reference time, the controller may increase a distance between the vehicle and another vehicle driving in front of the vehicle by a predetermined first rate of increase.

When the total time is greater than a second reference time and is less than or equal to a third reference time, the controller may increase a distance between the vehicle and another vehicle driving in front of the vehicle by a predetermined second rate of increase, decrease a braking amount of the vehicle to a predetermined braking amount, and limit a lane change of the vehicle.

In one aspect of the present disclosure, the vehicle may further include a communicator configured to exchange driving information with surrounding vehicles driving around the vehicle. When the total time is greater than a second reference time and less than or equal to a third reference time, the controller may transmit a request signal for increasing a distance between the vehicle and a rear vehicle, among the surrounding vehicles, driving behind the vehicle through the communicator.

When the total time is greater than the third reference time, the controller may increase a distance between the vehicle and a front vehicle driving in front of the vehicle by a predetermined third rate of increase, limit a lane change of the vehicle, and transmit the request signal for increasing the distance between the vehicle and the rear vehicle driving behind the vehicle through the communicator.

In accordance with another aspect of the disclosure, a method of controlling a vehicle includes obtaining, by a capturer, position information of a driver of the vehicle by capturing the driver driving in an autonomous driving mode; detecting, by a driver state detector, a state of the driver; determining, by a controller, a first time period to change from the autonomous driving mode to a manual operation mode of the vehicle based on the obtained position information and the detected state of the driver; and controlling, by the controller, a driving state of the vehicle to be changed based on the first time period.

The method may further include: determining, by the controller, whether the driver is located in one of a driver seat, an assistant seat, a rear seat, a passage of the vehicle, or a bed provided in the vehicle, based on the position information of the driver obtained by the capturer; and determining, by the controller, differently a second time period to change to the manual operation mode based on the determined location of the driver in the vehicle.

In another form, the method may further include: determining, by the controller, a degree of risk of driving the vehicle based on gaze information of the driver obtained by detecting a direction of eye gaze of the driver; and determining differently a third time period to change to the manual operation mode based on the determined degree of risk.

The method may further include detecting, by a seat belt fastening detector, whether a seat belt of the vehicle is fastened; and determining, by the controller, differently a fourth time period to change to the manual operation mode based on whether the seat belt is fastened.

The method may further include: calculating, by the controller, a sum of the first, second, third and fourth time periods for the change to the manual operation mode determined based on each of the obtained driver's position information, the detected driver state, and whether the detected seat belt is fastened; and determining, by the controller, a total time based on the calculated sum for the driver to sit in the driver seat and to start the manual operation mode of the vehicle.

The method may further include maintaining, by the controller, the autonomous driving mode when the total time required to change to the manual operation mode is less than or equal to a first reference time.

When the total time to change to the manual operation mode is greater than a first reference time and is less than or equal to a second reference time, the method may further include increasing, by the controller, a distance between the vehicle and another vehicle driving in front of the vehicle by a predetermined first rate of increase.

When the total time to change to the manual operation mode is greater than a second reference time and is less than or equal to a third reference time, the method may further include increasing, by the controller, a distance between the vehicle and another vehicle driving in front of the vehicle by a predetermined second rate of increase; decreasing, by the controller, a braking amount of the vehicle to a predetermined braking amount; and limiting, by the controller, a lane change of the vehicle.

The method may further include: exchanging, by a communicator, driving information with surrounding vehicles driving around the vehicle; and when the total time to change to the manual operation mode is greater than a second reference time and less than or equal to a third reference time, transmitting, by the controller, a request signal for increasing a distance between the vehicle and another vehicle driving behind the vehicle.

When the total time to change to the manual operation mode is greater than the third reference time, the method may further include increasing, by the controller, a distance between the vehicle and another vehicle driving in front of the vehicle by a predetermined third rate of increase; limiting, by the controller, a lane change of the vehicle; and transmitting, by the controller, a request signal for increasing a distance between the vehicle and another vehicle driving behind the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a view illustrating data for determining a time it takes for a vehicle to switch from autonomous driving to a manual operation mode of a driver.

Figure 1:
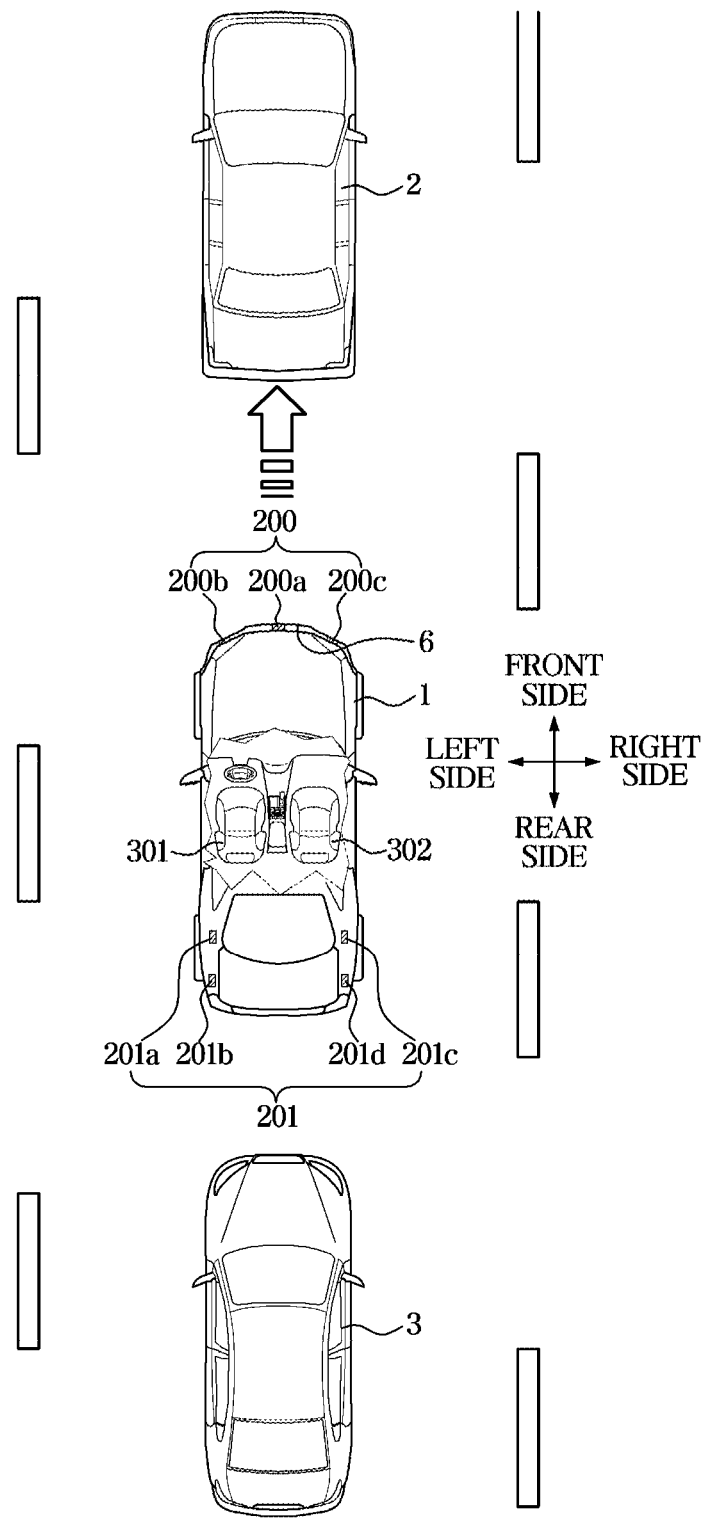
FIG. 1 is a view illustrating a vehicle having a sensor and a rear lateral side vehicle detector.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of exemplary forms of the disclosure will be described, and description of what are commonly known in the art or what overlap each other in the forms will be omitted. The terms as used throughout the specification, such as "~part," "~module," "~member," "~block," etc., may be implemented in software and/or hardware, and a plurality of "~parts," "~modules," "~members," or "~s blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary forms of the disclosure will now be described with reference to the accompanying drawings.

Figure 2:
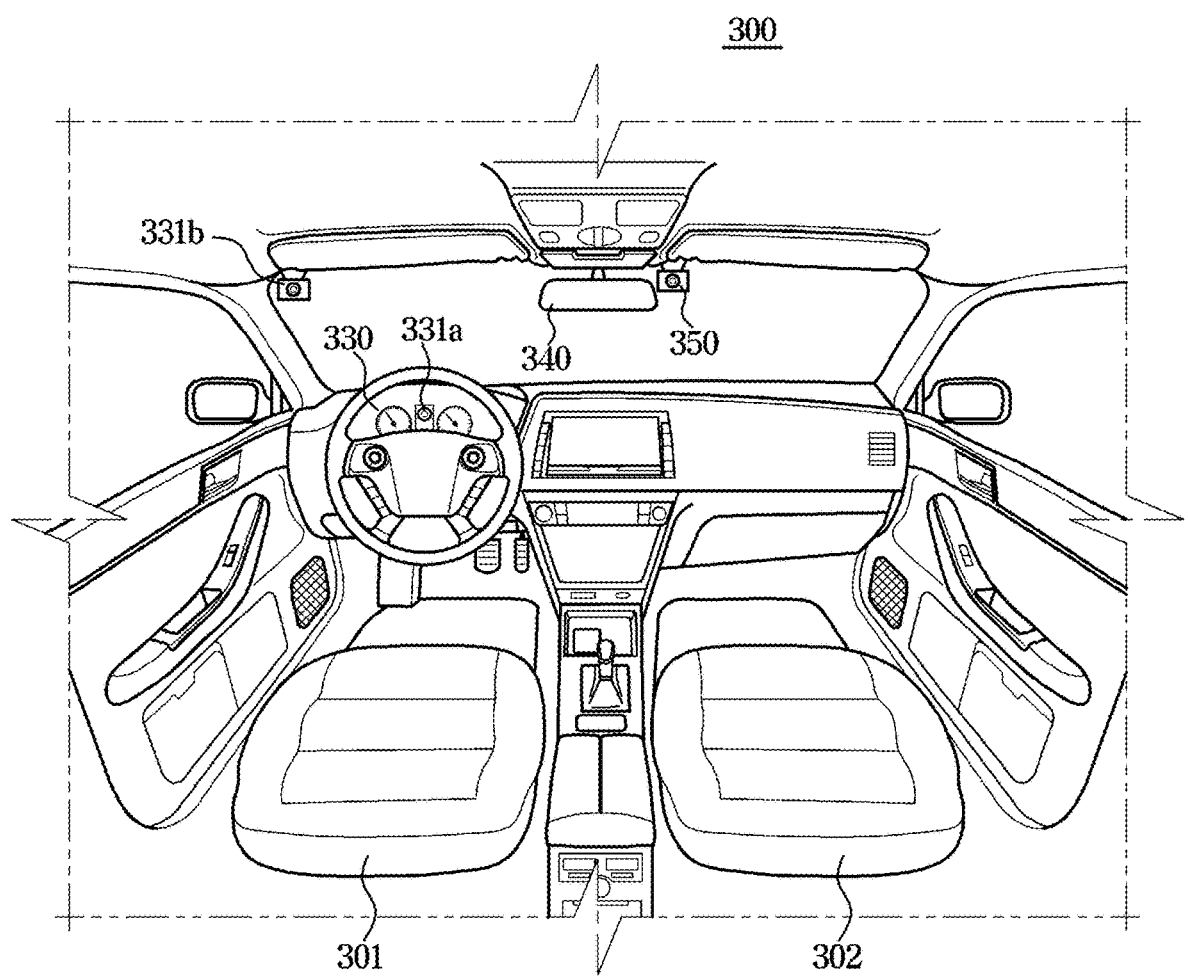
FIG. 2 is a view illustrating an interior structure of a vehicle.
Figure 3:
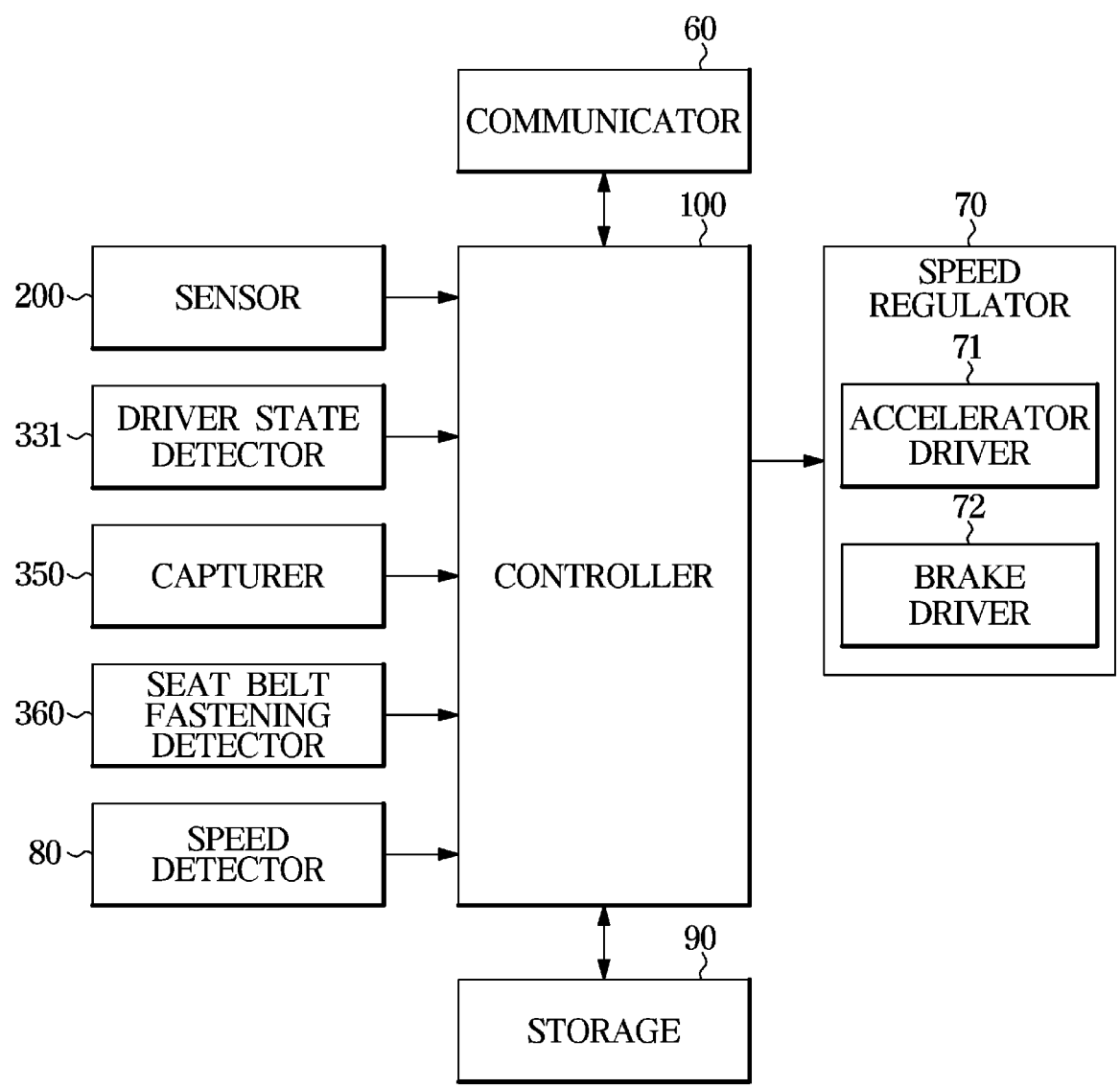
FIG. 3 is a control block diagram of a vehicle.
Figure 4:
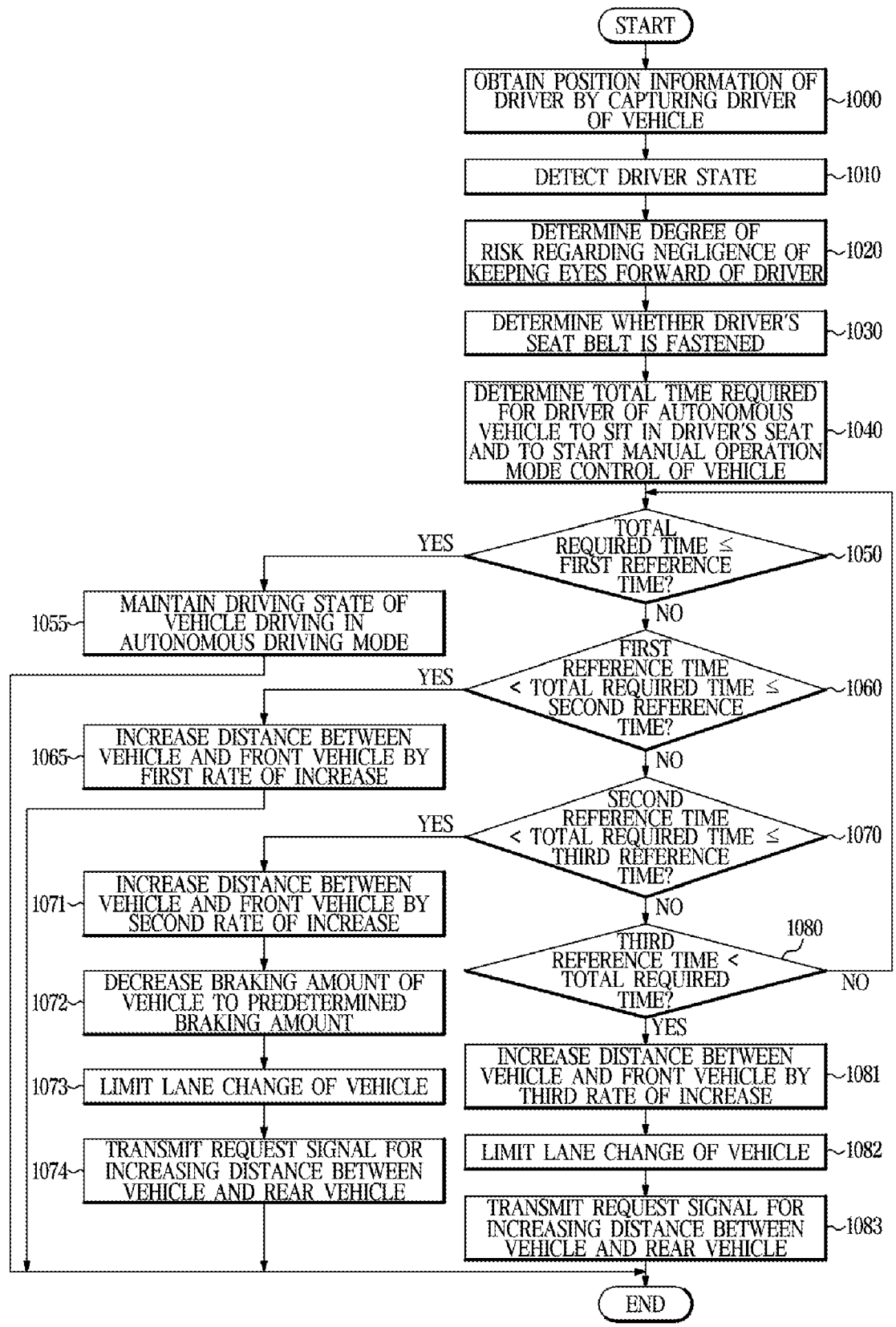
FIG. 4 is a flowchart illustrating a method of controlling a vehicle.

FIG. 1 is a view illustrating a vehicle provided with a sensor and a rear lateral side vehicle detector according to exemplary forms of the disclosure, FIG. 2 is a view illustrating an interior structure of a vehicle according to exemplary forms of the disclosure, FIG. 3 is a control block diagram of a vehicle according to exemplary forms of the disclosure, and FIG. 4 is a flowchart illustrating a method of controlling a vehicle according to exemplary forms of the disclosure.

For convenience of description, a direction in which a vehicle 1 advances is referred to as a forward of the vehicle, and a leftward direction and a rightward direction are distinguished with respect to the forward direction, in which when the forward direction is a direction at 12 o'clock, a direction at 3 o'clock and a surrounding thereof are defined as the rightward direction, and a direction at 9 o'clock and a surrounding thereof are defined as the leftward direction. The opposite direction of the forward direction is the rearward direction. In addition, a direction of the bottom of the vehicle is referred to as a downward direction, and the opposite direction of the downward direction is referred to as the upward direction. One side facing in the forward direction is referred to as a front side, one side facing in the rearward direction is referred to as a rear side, and sides arranged in a lateral direction are referred to as lateral sides, in which one of the lateral sides facing leftward is referred to as a left side, and the other one of the lateral sides facing rightward is referred to as a right side.

Referring to FIG. 1, the vehicle 1 may be provided with a sensor 200 for detecting an object located in front of the vehicle 1 and obtaining at least one of positional information and traveling speed information of the detected object.

The sensor 200 may obtain at least one of position information and speed information of an object located around the vehicle 1. That is, the sensor 200 may obtain coordinate information that changes in real time according to movement of the object, and may detect the distance between the vehicle 1 and the object.

As will be described below, a controller 100 (see FIG. 3) may calculate the relative distance and the relative speed of the vehicle 1 and the object using the position information and the speed information of the object obtained by the sensor 200, and may calculate a collision expected time (a time to collision: TTC) of the vehicle 1 and the object on the basis of the relative distance and the relative speed.

Referring to FIG. 1, the sensor 200 may be installed at a position suitable for recognizing an object (e.g., another vehicle) located on the front side, the lateral sides, or the front-lateral sides. According to one form, the sensor 200 may be installed on the front side, the left side, and the right side to recognize all objects located in a forward direction, a direction between the left side and the front side (hereinafter, referred to as a "left front side"), and a direction between the right side and the front side (hereinafter, referred to as a "right front side").

For example, a first sensor 200a may be installed on a part of a radiator grille 6, for example, at an inside of the radiator grille 6, and may be installed in any position of the vehicle 1 as long as it can detect a vehicle positioned in front of the vehicle 1. According to one form of the present disclosure, the first sensor 200a is illustrated as being provided at the center of the front side of the vehicle 1 as an example. A second sensor 200b may be provided on the left side of the vehicle 1 and a third sensor 200c may be provided on the right side of the vehicle 1.

The sensor 200 may include a rear lateral side sensor 201 for detecting a pedestrian or another vehicle that exists on the rear side, the lateral side, or a side between the lateral side and the rear side of the vehicle 1 (hereinafter, referred to as a "rear lateral side"), or approaches from a direction corresponding thereto. The rear lateral side sensor 201 may be installed at a position suitable for recognizing an object located on the lateral side, the rear side, or the rear lateral side, for example, another vehicle.

For example, the rear lateral side sensor 201 may be installed on the left side and the right side of the vehicle 1 to recognize objects located in a direction between the left lateral side and the rear side (hereinafter, referred to as a "left rear side") and a direction between the right side and the rear side (hereinafter, referred to as a "right rear side"). For example, a first rear lateral side sensor 201a or a second rear lateral side sensor 201b may be provided on the left side of the vehicle 1, and a third rear lateral side sensor 201c or a fourth rear lateral side sensor 201d may be provided on the right side of the vehicle 1.

The sensor 200 may be implemented using a radar using millimeter waves or microwaves, a light detection and ranging (LiDAR) using a pulse laser beam, a vision sensor using visible light, an infrared sensor using infrared rays, an ultrasonic sensor using ultrasonic waves, or the like. The sensor 200 may be implemented using one or a combination of these devices described above. When a plurality of sensors 200 are provided in one vehicle 1, each sensor 200 may be implemented with a single device, or may be implemented with separated devices. In addition, the sensor 200 may be implemented using various devices and combinations that may be considered by a designer.

Referring to FIG. 2, at least one capturer 350 may be provided in the vehicle 1. The capturer 350 may capture the inside of the vehicle 1. In detail, the capturer 350 may capture a driver inside the vehicle 1 to obtain position information of a driver or another passenger.

In other words, the capturer 350 may obtain the position information of the driver through image recognition by capturing the inside of the vehicle 1, and may transmit the obtained position information to the controller 100.

Although the capturer 350 is illustrated as being provided around a room mirror 340 in FIG. 2, the position in which the capturer 350 is provided is not limited. The capturer 350 may be mounted on various positions of the vehicle 1 as long as it can obtain image information by capturing the inside of the vehicle 1.

The capturer 350 may include at least one camera, and may include a three-dimensional space recognition sensor, a radar sensor, an ultrasonic sensor, or the like to capture a more precise image.

Referring to FIG. 2, a vehicle interior 300 is provided with a driver's seat 301, an assistant seat 302, an instrument panel 330, and a driver state detector 331.

The instrument panel 330 may be provided with a driver state detector 331 for detecting a driver state of the driver. The driver state detector 331 (331a and 331b) may detect the current state of the driver who drives the vehicle 1. The driver state detector 331 is a driver state warning system for monitoring a negligence of keeping eyes forward or a drowsy driving of the driver of the vehicle 1.

For example, the driver state detector 331 may detect at least one of a face angle and a pupil angle of the driver to obtain gaze information of the driver, and may transmit the obtained gaze information of the driver to the controller 100.

In addition, the driver state detector 331 may extract a face image from the image obtained through the camera and identify the driver state through the extracted face image. That is, the driver state detector 331 may detect whether the driver is looking forward or whether the driver is driving while drowsy.

That is, the driver state detector 331 may detect whether the driver is negligent of keeping eyes forward or unable to control the vehicle 1 in the current state by obtaining the gaze information or capturing the face, a direction of eye gaze, or pupil of the driver.

The method of detecting the current state of the driver by the driver state detector 331 may be implemented using various ways. In addition, although the driver state detector 331a is illustrated as being provided on the instrument panel 330, there is no limitation on the position in which the driver state detector 331a is installed, and the driver state detector 331a may be installed at any position of the vehicle 1 as long as it can obtain driver state information, such as gaze information of the driver. That is, as illustrated in FIG. 2, the driver state detector 331b may be provided on the upper end of the driver's seat 301 inside the vehicle 1.

The driver state detector 331 may include a stereo camera for obtaining an image of a face or a pupil of a driver, and may be installed at a position in which the driver's face or pupil is captured to obtain gaze information of the driver.

Referring to FIG. 3, the vehicle 1 may include a communicator 60 for communicating with another vehicle or a server to transmit and receive data, a speed regulator 70 for regulating a driving speed of the vehicle 1 operated by the driver, a speed detector 80 for detecting the driving speed of the vehicle 1, a storage 90 for storing data related to the control of the vehicle 1, the controller 100 for operating each component of the vehicle 1 and controlling the driving speed of the vehicle 1, and seat belt fastening detector 360 for detecting whether a seat belt provided in the seat is fastened.

The communicator 60 may transmit and receive driving information with another vehicle driving around the vehicle 1. The communicator 60 may be implemented using a communication chip, an antenna, and related components so as to be connected to at least one of a wired communication network and a wireless communication network. That is, the communicator 60 may be implemented as various types of communication modules capable of short-range communication or long-distance communication with other vehicles.

The speed regulator 70 may regulate the speed of the vehicle 1 operated by the driver. The speed regulator 70 may include an accelerator driver 71 and a brake driver 72.

The accelerator driver 71 may increase the speed of the vehicle 1 by driving an accelerator in response to receiving a control signal of the controller 100. The brake driver 72 may decrease the speed of the vehicle 1 by driving a brake in response to receiving a control signal of the controller 100.

That is, the controller 100 may calculate the collision expected time between the vehicle 1 and the object on the basis of the relative distance and the relative speed of the vehicle 1 and the object, and may transmit a signal for controlling the driving speed of the vehicle 1 on the basis of the calculated collision expected time to the speed regulator 70.

The speed regulator 70 may regulate the driving speed of the vehicle 1 under the control of the controller 100. When a degree of risk of collision between the vehicle 1 and another object is high, the speed regulator 70 may decrease the driving speed of the vehicle 1.

The speed detector 80 may detect the driving speed of the vehicle 1 driven by the driver under the control of the controller 100. That is, the speed detector 80 may detect the driving speed by using the speed at which the wheel of the vehicle 1 is rotated, and the like. The unit of the driving speed may be expressed in [kph], that is, the distance (km) traveled per unit time (h).

The storage 90 may store various pieces of data related to the control of the vehicle 1. Particularly, the storage 90 may store data about a time required for the autonomous vehicle 1 to change to a manual operation mode of the driver according to the position and state of the driver.

In addition, the storage 90 may store data about the amount of braking for controlling the braking of the vehicle 1 and data for controlling the distance between vehicles based on the time required to change to the manual operation mode.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto. The storage 90 may be a memory that is implemented by a separate memory chip from the aforementioned processor related to the controller 100 or the storage may be implemented by a single chip with a processor.

The controller 100 may be provided in at least one unit thereof in the vehicle 1. The controller 100 may perform electronic control on each configuration related to the operation of the vehicle 1.

Figure 5:
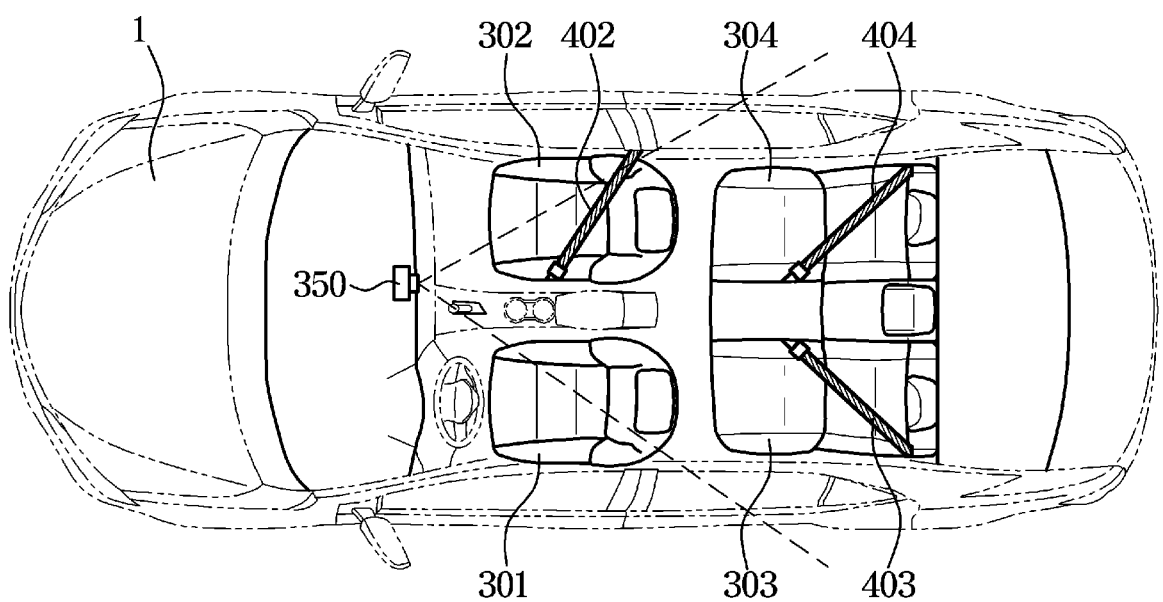
FIG. 5 is a view illustrating an example of obtaining position information of a driver.
Figure 6:
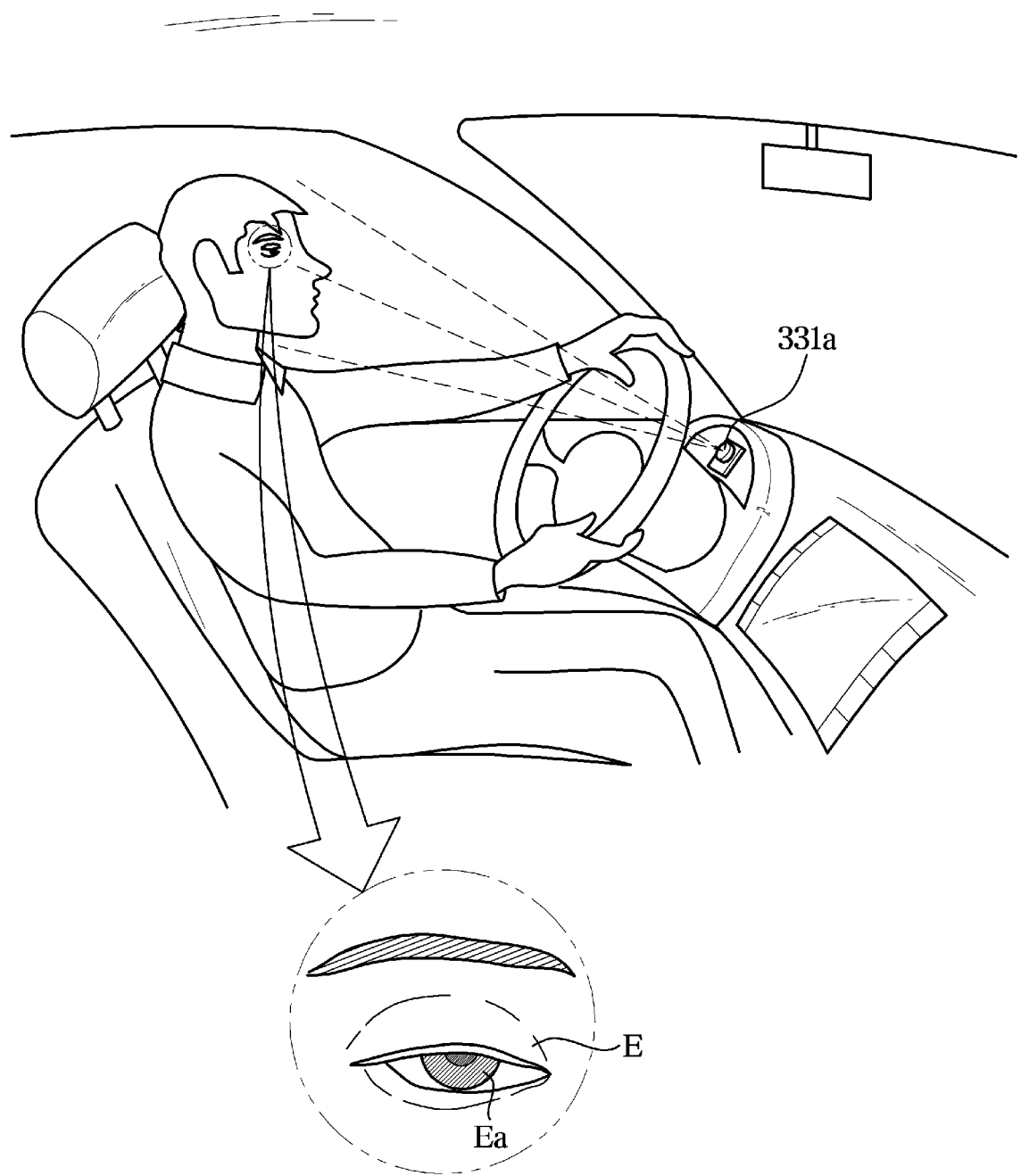
FIG. 6 is a view illustrating an example of detecting a state of a driver.
Figure 8:
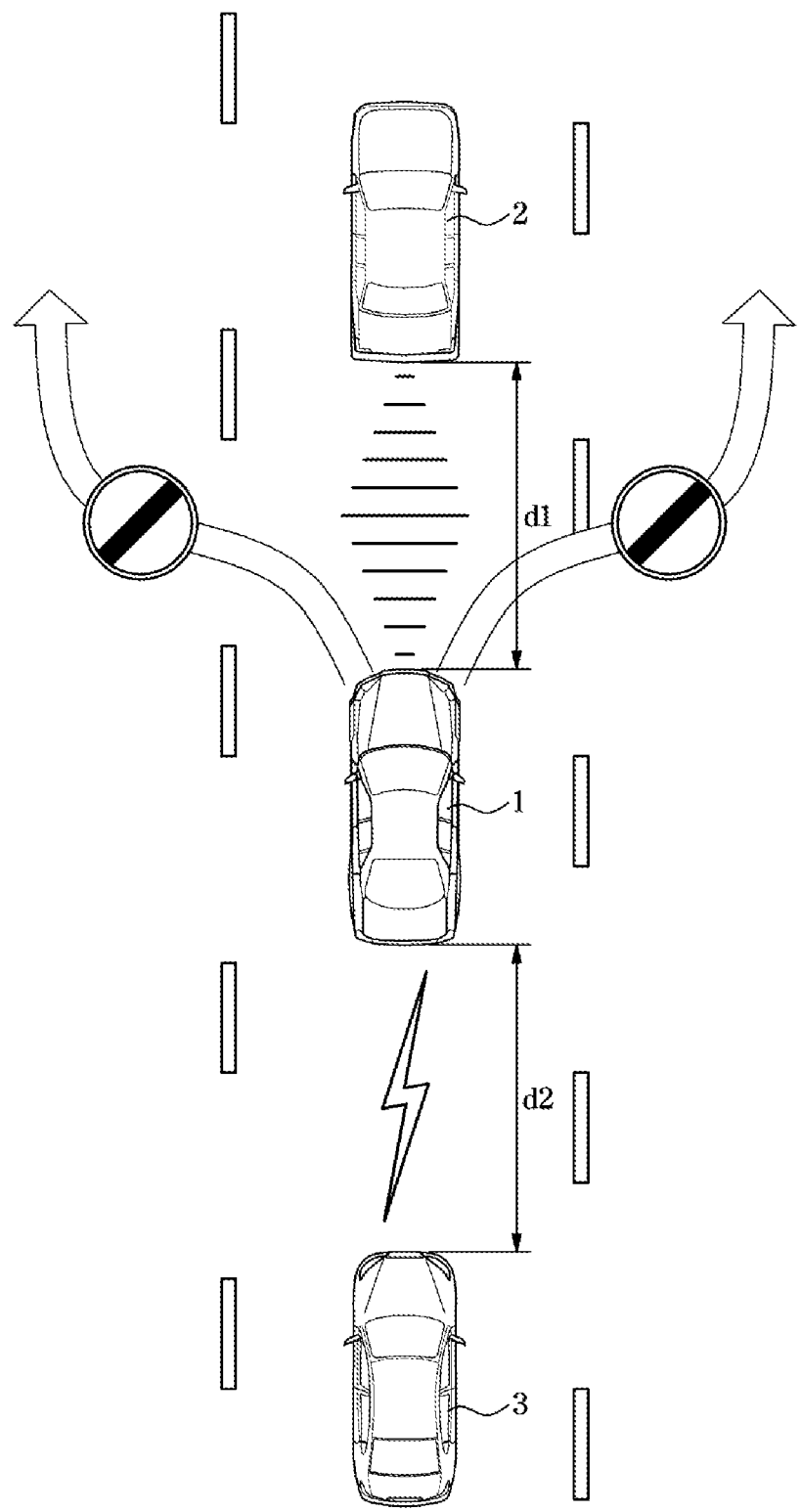
FIG. 8 is a conceptual view illustrating adjusting a distance between vehicles and limiting lane changes of a vehicle.

FIG. 5 is a view illustrating an example of obtaining position information of a driver according to exemplary forms of the disclosure, FIG. 6 is a view illustrating an example of detecting a state of a driver according to exemplary forms of the disclosure, FIG. 7 is a view illustrating data for determining a time it takes for a vehicle to switch from autonomous driving to a manual operation mode of a driver, according to exemplary forms of the disclosure, and FIG. 8 is a conceptual view illustrating adjusting a distance between vehicles and limiting lane changes of a vehicle, according to exemplary forms of the disclosure.

The vehicle 1 is generally applied to a truck or bus that performs platooning, but may also be applied to a general passenger car.

Referring to FIG. 4, the capturer 350 may obtain the position information of the driver by capturing the driver inside the vehicle 1 driving in an autonomous driving mode (1000).

In other words, the time required to change an operation mode of the vehicle 1 to the manual operation mode may vary according to the position where the driver is seated in the vehicle 1.

The controller 100 may determine whether the driver is located in any one of the driver's seat 301, the assistant seat 302, a rear seat, a passage of the vehicle 1, or a bed provided inside the vehicle 1, based on the position information of the driver obtained by the capturer 350, and may differently determine the time required to change to the manual operation mode of the driver based on the determined driver's position.

Referring to FIG. 7, the controller 100 may differently determine the time required to change the operation mode to the manual operation mode according to whether the driver's position is any one of the driver's seat 301, the assistant seat 302, the passage 603, sitting on a bed provided in the vehicle 1 (604), or lying on the bed. When the driver is seated in the driver's seat 301, it takes little time to change to the manual operation mode. However, when the driver is seated in the driver's seat 301 but the seat of the driver's seat 301 is rotated, the seat must be rotated to face the front of the vehicle 1 so that it can be changed to the manual operation mode, so additional time is required to rotate the seat, and the time required may be, for example, about 3.5 seconds.

When the driver is seated in the assistant seat 302, the driver needs to move to the driver's seat 301 to change to the manual operation mode, so that it takes a predetermined time to move to the driver's seat 301. In this case, when the driver seated in the assistant seat 302 is fastening the seat belt, the driver needs to release the fastened seat belt and move to the driver's seat 301. Therefore, it takes more time to change to the manual operation mode than when the seat belt is not fastened, as illustrated in FIG. 7.

In addition, when the driver is located in the passage 603, the driver must move to the driver's seat 301 to change to the manual operation mode, so it takes the predetermined time to move to the driver's seat 301. For example, the time required may be about 1 second.

In addition, depending on when the driver is sitting on the bed (604) and when the driver is lying on the bed (605), the time required to move to the driver's seat 301 to change to the manual operation mode may vary.

The driver state detector 331 may detect the driver state of the vehicle 1 (1010).

In other words, the driver state detector 331 may obtain the gaze information of the driver, and the controller 100 may determine a degree of risk regarding a negligence of keeping eyes forward on the basis of the obtained gaze information of the driver (1020), and may differently determine the time required to change to the manual operation mode of the driver on the basis of the determined degree of risk.

Referring to FIG. 6, the controller 100 may determine whether the area of a pupil Ea is less than a predetermined area with respect to the area of an eye ball E of the driver photographed by the driver state detector 331, and when the area of the pupil Ea is less than the predetermined area, the driver may be determined to drive while drowsy. In addition, the controller 100, in response to determining that the driver to drive while drowsy, may determine the degree of risk regarding the negligence of keeping eyes forward to a predetermined value.

In other words, since the risk of an accident increases when the driver drives while drowsy during travelling of the vehicle 1 as illustrated in FIG. 6, the controller 100 compares the area of the pupil Ea photographed by the driver state detector 331 with a predetermined reference area stored in the storage 90, and when the area of the pupil Ea is less than or equal to the predetermined reference area, determine that the eyes of the driver are closed to some extent.

The controller 100 may determine that the driver is currently unable to drive the vehicle 1 when the degree of risk determined by the drowsiness of the driver corresponds to the predetermined value.

In other words, the controller 100 may determine the degree of risk regarding the negligence of keeping eyes forward depending on whether the driver state captured by the driver state detector 331 is looking the front of the vehicle 1 or not, and may determine the degree of risk differently according to the drowsiness state of the driver.

As illustrated in FIG. 7, when the driver state is not looking the front of the vehicle 1, it takes 0.5 seconds to change to the manual operation mode, and when the driver state is the drowsy driving, it may take another 1 second to change to the manual operation mode.

In addition, as described above, even when the driver is sitting on the bed inside the vehicle 1, it may take about 1 second longer to change to the manual operation mode when the driver is not looking forward than when the driver is looking forward.

Even when the driver is lying in the bed inside the vehicle 1, it may take about one second longer to change to the manual operation mode when the driver is sleeping than when the driver is awake.

The vehicle 1 may further include the seat belt fastening detector 360 for detecting whether the vehicle 1 is fastened to the seat belt.

Referring to FIG. 5, each seat of the vehicle 1 may be provided with seat belts 402, 403, and 404. When each seat belt 402, 403, and 404 is fastened, the controller 100 may determine whether the driver's seat belt is fastened based on a detection result of the seat belt fastening detector 360 (1030).

Referring to FIG. 7, when the driver is seated in the driver's seat 301, whether the seat belt is fastened or not is not affected, the time required to change to the manual operation mode is not affected. However, when the driver is seated on the assistant seat 302, the driver must move to the driver's seat to change to the manual operation mode. Therefore, when the seat belt 402 of the assistant seat 302 is fastened, since it takes time to release the seat belt 402, the time required to change to the manual operation mode is increased than when the seat belt 402 is not fastened.

The controller 100 may sum up each time required for the manual operation mode determined based on each of the driver's position information obtained by the capturer 350, the driver state detected by the driver state detector 331, and whether the seat belt detected by the seat belt fastening detector 360 is fastened, and may determine a total time required for the driver of the autonomous vehicle 1 to sit in the driver's seat 301 and to start the manual operation mode control of the vehicle 1 (1040).

In other words, the total time required for the autonomous vehicle 1 to change to the manual operation mode (i.e., manually driving the vehicle by the driver) may be the sum of the time required to change to the manual operation mode for each position of the driver, the time for releasing the fastened seat belt, and the time required to change the manual operation mode for each state of the driver.

The controller 100 may determine whether the total time required for the vehicle 1 to change to the manual operation mode is less than or equal to a first reference time based on a reference time stored in the storage 90 (1050). In this case, the first reference time may be, for example, 1.5 seconds, but is not limited thereto.

When the total time required for the vehicle 1 to change to the manual operation mode is less than or equal to the first reference time, the controller 100 may maintain a driving state of the vehicle 1 driving in the autonomous driving mode (1055). That is, when the total required time is short, for example less than 1.5 seconds, the vehicle 1 may be changed to the manual operation mode within a relatively short time, and thus the vehicle 1 may maintain the current autonomous driving mode without performing other control.

When the total time required for the vehicle 1 to change to the manual operation mode is greater than the first reference time, the controller 100 may determine whether the total time required for the vehicle 1 to change to the manual operation mode is greater than the first reference time and less than or equal to a second reference time based on the reference time stored in the storage 90 (1060). In this case, the second reference time may be, for example, 2.5 seconds, but is not limited thereto.

When the total time required for the vehicle 1 to change to the manual operation mode is greater than the first reference time and is less than or equal to the second reference time, the controller 100 may increase the distance between the vehicle 1 and another vehicle 2 driving in front of the vehicle 1 by a predetermined first rate of increase (1065).

In other words, when the total time required for the vehicle 1 to change to the manual operation mode is greater than 1.5 seconds and is less than or equal to 2.5 seconds, there is a risk that the vehicle 1 may collide with another vehicle 2 driving in the front while changing to the manual operation mode. Therefore, as illustrated in FIG. 8, the controller 100 may increase a distance d1 between the autonomous vehicle 1 and the front vehicle 2 by the first rate of increase. In this case, the first rate of increase may be, for example, 20%, but is not limited.

When the total time required for the vehicle 1 to change to the manual operation mode is greater than the second reference time, the controller 100 may determine whether the total time required for the vehicle 1 to change to the manual operation mode is greater than the second reference time and less than or equal to a third reference time based on the reference time stored in the storage 90 (1070). In this case, the third reference time may be, for example, 4 seconds, but is not limited thereto.

When the total time required for the vehicle 1 to change to the manual operation mode is greater than the second reference time and is less than or equal to the third reference time, the controller 100 may increase the distance between the vehicle 1 and another vehicle 2 driving in front of the vehicle 1 by a predetermined second rate of increase (1071).

In other words, when the total time required for the vehicle 1 to change to the manual operation mode is greater than 2.5 seconds and is less than or equal to 4 seconds, the risk of colliding with another vehicle 2 driving in the front while changing to the manual operation mode is higher. Therefore, as illustrated in FIG. 8, the controller 100 may increase the distance d1 between the autonomous vehicle 1 and the front vehicle 2 by the second rate of increase. In this case, the second rate of increase may be, for example, 20% or greater than the first rate of increase, but is not limited.

In addition, when the total time required for the vehicle 1 to change to the manual operation mode is greater than the second reference time and is less than or equal to the third reference time, the controller 100 may decrease a braking amount of the vehicle 1 to a predetermined braking amount (1072).

In other words, when the total time required for the vehicle 1 to change to the manual operation mode is greater than 2.5 seconds and is less than or equal to 4 seconds, the risk of colliding with another vehicle 2 driving in the front while changing to the manual operation mode is higher. At this time, when the braking amount of the vehicle 1 is not decreased, the risk of sudden stop exists, so that the controller 100 may decrease the braking amount of the vehicle 1 to the predetermined value. At this time, the braking amount of the decreased vehicle 1 may be, for example, about 20%, but is not limited thereto.

In addition, when the total time required for the vehicle 1 to change to the manual operation mode is greater than the second reference time and is less than or equal to the third reference time, the controller 100 may limit a lane change of the vehicle 1 (1073).

In other words, when the total time required for the vehicle 1 to change to the manual operation mode is greater than 2.5 seconds and is less than or equal to 4 seconds, since it takes a considerable time to change to the manual operation mode, as illustrated in FIG. 8, the controller 100 may limit the lane change of the vehicle 1 except in an emergency until the change to the manual operation mode is completed.

In addition, when the total time required for the vehicle 1 to change to the manual operation mode is greater than the second reference time and is less than or equal to the third reference time, the controller 100 may transmit a request signal for increasing a distance d2 between the vehicle 1 and another vehicle 3 driving behind the vehicle 1 through the communicator 60 (1074).

In other words, when the total time required for the vehicle 1 to change to the manual operation mode is greater than 2.5 seconds and is less than or equal to 4 seconds, since it takes the considerable time to change to the manual operation mode, and there is the risk of collision between the vehicle 1 and the rear vehicle 3, the controller 100 may transmit a coordination request to increase the inter-vehicle distance d2 for the rear vehicle 3 as illustrated in FIG. 8. In this case, the increase rate of the distance d2 between the vehicle 1 and the rear vehicle 3 may be, for example, 20%, but is not limited thereto.

The controller 100 may determine whether the total time required for the vehicle 1 to change to the manual operation mode is greater than the third reference time based on the reference time stored in the storage 90 (1080).

When the total time required for the vehicle 1 to change to the manual operation mode is greater than the third reference time, the controller 100 may increase the distance between the vehicle 1 and another vehicle 2 driving in front of the vehicle 1 by a predetermined third rate of increase (1081).

In other words, when the total time required for the vehicle 1 to change to the manual operation mode is greater than 4 seconds, the risk of colliding with another vehicle 2 driving in the front while changing to the manual operation mode is higher. Therefore, as illustrated in FIG. 8, the controller 100 may increase the distance d1 between the autonomous vehicle 1 and the front vehicle 2 by the third rate of increase. In this case, the third rate of increase may be, for example, a maximum rate that may be increased of the inter-vehicle distance d1, but is not limited thereto.

In addition, when the total time required for the vehicle 1 to change to the manual operation mode is greater than the third reference time, the controller 100 may limit a lane change of the vehicle 1 (1082).

In other words, when the total time required for the vehicle 1 to change to the manual operation mode is greater than 4 seconds, since it takes the considerable time to change to the manual operation mode, as illustrated in FIG. 8, the controller 100 may limit the lane change of the vehicle 1 except in the emergency until the change to the manual operation mode is completed.

In addition, when the total time required for the vehicle 1 to change to the manual operation mode is greater than the third reference time, the controller 100 may transmit a request signal for increasing the distance d2 between the vehicle 1 and another vehicle 3 driving behind the vehicle 1 through the communicator 60 (1083).

In other words, when the total time required for the vehicle 1 to change to the manual operation mode is greater than 4 seconds, since it takes the considerable time to change to the manual operation mode, and there is the risk of collision between the vehicle 1 and the rear vehicle 3, the controller 100 may transmit the coordination request to increase the inter-vehicle distance d2 for the rear vehicle 3 as illustrated in FIG. 8. In this case, the increase rate of the distance d2 between the vehicle 1 and the rear vehicle 3 may be, for example, 20%, but is not limited thereto.

According to the vehicle and the method of controlling the vehicle according to the exemplary forms, when switching from the autonomous driving to the driver's manual operation, the vehicle is controlled in consideration of the driver's position and the driving mode, thereby securing driving stability and preventing secondary accidents.

Meanwhile, the disclosed exemplary forms may be implemented in the form of a recording medium storing instructions that are executable by a computer. The instructions may be stored in the form of a program code, and when executed by a processor, the instructions may generate a program module to perform operations of the disclosed exemplary forms. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Exemplary forms of the disclosure have thus far been described with reference to the accompanying drawings. It will be obvious to those of ordinary skill in the art that the disclosure may be practiced in other forms than the forms as described above without changing the technical idea or essential features of the disclosure. The above forms are only by way of example, and should not be interpreted in a limited sense.

What is claimed is:

1. A vehicle comprising:
a capturer configured to capture a driver of the vehicle driving in an autonomous driving mode and obtain position information of the driver;
a driver state detector configured to detect a state of the driver; and
a controller configured to:
determine a first time period to change from the autonomous driving mode to a manual operation mode of the vehicle based on the position information and the state of the driver; and
control a driving state of the vehicle to be changed based on the first time period to change from the autonomous driving mode to the manual operation mode,
wherein the controller is further configured to:
determine a total time based on a sum of the first time period and additional time periods for the driver of the vehicle to sit in a driver seat and to start the manual operation mode of the vehicle, and
wherein when the total time is greater than a predetermined time, the controller is configured to:
increase a distance between the vehicle and another vehicle driving in front of the vehicle by a predetermined distance;
decrease a braking amount of the vehicle to a predetermined braking amount; and
limit a lane change of the vehicle.

2. The vehicle according to claim 1, wherein the controller is configured to:
determine whether the driver is located in one of the driver seat, an assistant seat, a rear seat, a passage of the vehicle, or a bed provided in the vehicle, based on the position information of the driver; and
determine a second time period to change to the manual operation mode based on the determined location of the driver in the vehicle, and
wherein the additional time periods include the second time period.

3. The vehicle according to claim 2, wherein the driver state detector is configured to detect a direction of eye gaze of the driver and obtain gaze information of the driver from the detected eye gaze direction, and
wherein the controller is configured to:
determine a degree of risk of driving the vehicle based on the obtained gaze information of the driver, and
determine a third time period to change to the manual operation mode based on the determined degree of risk, and
wherein the additional time periods include the third time period.

4. The vehicle according to claim 3, further comprising:
a seat belt fastening detector configured to detect whether a seat belt of the vehicle is fastened,
wherein the controller is configured to determine a fourth time period to change to the manual operation mode based on whether the seat belt is fastened,
wherein the additional time periods include the fourth time period.

5. The vehicle according to claim 4, wherein the controller is configured to calculate a sum of the first, second, third and fourth time periods for the change to the manual operation mode, and determine the total time based on the calculated sum for the driver of the vehicle to sit in the driver seat and to start the manual operation mode of the vehicle.

6. The vehicle according to claim 5, wherein the controller is configured to maintain the autonomous driving mode when the total time is less than or equal to a first reference time.

7. The vehicle according to claim 5, wherein, when the total time is greater than a first reference time and is less than or equal to a second reference time, the controller is configured to increase the distance between the vehicle and the another vehicle driving in front of the vehicle by a predetermined first rate of increase.

8. The vehicle according to claim 5, wherein:
the predetermined time is greater than a second reference time and is less than or equal to a third reference time; and
the predetermined distance is a distance increased by a predetermined second rate.

9. The vehicle according to claim 5, further comprising:
a communicator configured to exchange driving information with surrounding vehicles driving around the vehicle,
wherein, when the total time is greater than a second reference time and less than or equal to a third reference time, the controller is configured to transmit through the communicator a request signal for increasing a distance between the vehicle and a rear vehicle, among the surrounding vehicles, driving behind the vehicle.

10. The vehicle according to claim 9, wherein
when the total time is greater than the third reference time, the controller is configured to:
increase a distance between the vehicle and a front vehicle among the surrounding vehicles by a predetermined third rate of increase;
limit the lane change of the vehicle; and
transmit the request signal for increasing the distance between the vehicle and the rear vehicle driving behind the vehicle through the communicator.

11. A method of controlling a vehicle, comprising:
obtaining, by a capturer, position information of a driver of the vehicle by capturing the driver driving the vehicle in an autonomous driving mode;
detecting, by a driver state detector, a state of the driver;
determining, by a controller, a first time period to change from the autonomous driving mode to a manual operation mode of the vehicle based on the obtained position information and the detected state of the driver; and
controlling, by the controller, a driving state of the vehicle to be changed based on the first time period,
determining, by the controller, a total time based on a sum of the first time period and additional time periods for the driver to sit in a driver seat and to start the manual operation mode of the vehicle,
when the total time is greater than a predetermined time, increasing, by the controller, a distance between the vehicle and a front vehicle driving in front of the vehicle by a predetermined distance;
decreasing, by the controller, a braking amount of the vehicle to a predetermined braking amount; and
limiting, by the controller, a lane change of the vehicle.

12. The method according to claim 11, further comprising:
determining, by the controller, whether the driver is located in one of the driver seat, an assistant seat, a rear seat, a passage of the vehicle, or a bed provided in the vehicle, based on the position information of the driver obtained by the capturer; and
determining, by the controller, differently a second time period to change to the manual operation mode based on the determined location of the driver in the vehicle,
wherein the additional time periods include the second time period.

13. The method according to claim 12, further comprising:
determining, by the controller, a degree of risk of driving the vehicle based on gaze information of the driver obtained by detecting a direction of eye gaze of the driver, and
determining differently a third time period to change to the manual operation mode based on the determined degree of risk,
wherein the additional time periods include the third time period.

14. The method according to claim 13, further comprising:
detecting, by a seat belt fastening detector, whether a seat belt of the vehicle is fastened; and
determining, by the controller, differently a fourth time period to change to the manual operation mode based on whether the seat belt is fastened,
wherein the additional time periods include the fourth time period.

15. The method according to claim 14, further comprising:
calculating, by the controller, a sum of the first, second, third and fourth time periods for the change to the manual operation mode; and
determining, by the controller, the total time based on the calculated sum for the driver to sit in the driver seat and to start the manual operation mode of the vehicle.

16. The method according to claim 15, further comprising:
maintaining, by the controller, the autonomous driving mode when the total time to change to the manual operation mode is less than or equal to a first reference time.

17. The method according to claim 15, further comprising:
when the total time to change to the manual operation mode is greater than a first reference time and is less than or equal to a second reference time, increasing, by the controller, the distance between the vehicle and the front vehicle driving in front of the vehicle by a predetermined first rate of increase.

18. The method according to claim 15, wherein
the predetermined time is greater than a second reference time and is less than or equal to a third reference time; and
the predetermined distance is a distance increased by a predetermined second rate.

19. The method according to claim 15, further comprising:
exchanging, by a communicator, driving information with surrounding vehicles driving around the vehicle; and
when the total time to change to the manual operation mode is greater than a second reference time and less than or equal to a third reference time, transmitting, by the controller, a request signal for increasing a distance between the vehicle and a rear vehicle, among the surrounding vehicles, driving behind the vehicle.

20. The method according to claim 15, further comprising:
when the total time to change to the manual operation mode is greater than a third reference time, increasing, by the controller, the distance between the vehicle and the front vehicle driving in front of the vehicle by a predetermined third rate of increase;
limiting, by the controller, the lane change of the vehicle; and transmitting, by the controller, a request signal for increasing a distance between the vehicle and a rear vehicle driving behind the vehicle.

* * * * *